US006894835B2

United States Patent
Ohsako et al.

(10) Patent No.: US 6,894,835 B2
(45) Date of Patent: May 17, 2005

(54) PROJECTION SCREEN AND METHOD FOR MANUFACTURING THE SAME

(75) Inventors: Junichi Ohsako, Tokyo (JP);
Masayasu Kakinuma, Kanagawa (JP);
Hideya Chubachi, Tokyo (JP); Hiroshi Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/614,688

(22) Filed: Jul. 7, 2003

(65) Prior Publication Data

US 2004/0061935 A1 Apr. 1, 2004

(30) Foreign Application Priority Data

Jul. 5, 2002 (JP) ........................ 2002-197313

(51) Int. Cl.[7] ............... G03B 21/56; G03B 21/60
(52) U.S. Cl. ............... 359/449; 359/455; 359/459
(58) Field of Search .................. 359/449, 443, 359/452, 454, 455, 459

(56) References Cited

U.S. PATENT DOCUMENTS

| | | | | |
|---|---|---|---|---|
| 2,480,031 A | * | 8/1949 | Kellogg ............... | 359/457 |
| 3,510,197 A | * | 5/1970 | Takeo et al. ............ | 359/461 |
| 3,964,822 A | * | 6/1976 | Yamashita ............ | 359/443 |
| 4,190,320 A | * | 2/1980 | Ferro ............ | 359/459 |
| 4,232,939 A | * | 11/1980 | Kikuchi ............ | 359/459 |
| 5,456,967 A | * | 10/1995 | Nezu ............ | 428/141 |
| 6,233,095 B1 | * | 5/2001 | Niwa et al. ............ | 359/443 |
| 6,529,322 B1 | * | 3/2003 | Jones et al. ............ | 359/443 |
| 6,636,363 B2 | * | 10/2003 | Kaminsky et al. ............ | 359/707 |
| 6,724,529 B2 | * | 4/2004 | Sinkoff ............ | 359/443 |

FOREIGN PATENT DOCUMENTS

JP          2003270725 A    *   9/2003   ........... G03B/21/60

* cited by examiner

*Primary Examiner*—Judy Nguyen
*Assistant Examiner*—Magda Cruz
(74) *Attorney, Agent, or Firm*—Wolf, Greenfield & Sacks, P.C.

(57) ABSTRACT

A projection screen includes a plurality of convex portions serving as a light diffusion control portion, on the surface of a substrate. An optical thin film overlies the substrate and has convex portions having the same shape as that of the convex portions of the substrate. When external light enters the optical thin film with light in three primary color wavelength bands, the optical thin film reflects only the light in the three color wavelength bands and absorbs at least visible light of the external light. When light in the three primary color wavelength bands perpendicularly enters the optical thin film, the rays of the light have incident angles at the convex portions of the optical thin film and diffuse-reflected at angles twice the incident angles. Thus, a predetermined percentage of the light is diffused to increase the viewing angle of the screen.

29 Claims, 10 Drawing Sheets

PRIOR ART

PROJECTION SCREEN AND METHOD FOR MANUFACTURING THE SAME

BACKGROUND OF THE INVENTION

1. Field of the Invention

The present invention relates to projection screens on which images are displayed by receiving light from a light source. In particular, the present invention relates to a reflective projection screen and a method for manufacturing the same.

2. Description of the Related Art

Overhead projectors and slide projectors have widely been used for showing materials in meetings and the like. Also, the use of video projectors and animation film projectors is spreading to ordinary households. In these projectors, light from a light source is spatially modulated to imaging light by a light valve, and the image light is projected onto a screen through an illumination optical system, such as a lens.

Some of this type of projectors can display color images and in which a lamp for emitting white light including three primary colors, which are red (R), green (G), and blue (B), is used as the light source and a transmissive liquid crystal panel is used as the light valve. In these projectors, white light emitted from a light source is divided into red light, green light, and blue light. Each color light is converged on a predetermined light path. These beams of light are spatially modulated by the liquid crystal panel, according to an image signal. The modulated light beams are synthesized to color image light in a photosynthesis portion. The synthesized color image light is magnified through a lens to be projected onto a projection screen.

Another type of projectors capable of displaying color images has recently been developed which includes a narrow-band three primary color light source, which may be a laser oscillator for emitting narrow-band light beams of three primary colors, and a grating light valve (GLV). In this projector, each color light beam emitted from the laser oscillator is spatially modulated by the GLV, according to image signals. The modulated light beams are synthesized to color image light in a photosynthesis portion, and the synthesized color image light is magnified through a lens to be projected onto a projection screen, as in the foregoing projector.

Screens used for the projectors are classified into the transmissive type and the reflective type. In a transmissive screen, projection light is emitted from the back side of the screen and viewed from the front. In a reflective screen, projection light is emitted from the front of the screen and the reflected light is viewed from the front. In either type, it is desired to form bright, high-contrast images in order to achieve a highly visible screen.

In front projectors using such a reflective projection screen, unfortunately, the reflection of external light cannot be suppressed by, for example, using a neutral density (ND) filter, in contrast to self-luminescent displays and rear projectors. In particular, it is difficult to increase the contrast on the projection screen in a bright environment.

In order to solve the problem, a projection screen 100 having an optical thin film 112 serving as a band-pass filter, as shown in FIG. 10, has been proposed in Japanese Patent Application Publication No. 2002-070799. The projection screen 100 includes a screen substrate 111 serving as a light absorber and the optical thin film 112 on the screen substrate 111. The optical thin film 112 is a dielectric multilayer laminate reflecting light in a specific wavelength band and transmitting at least visible light other than the light in the specific wavelength band. Each thickness of the layers of the dielectric laminate is set according to a simulation based on a matrix method. A light diffusion layer 113 for diffusing the light reflected from the optical thin film 112 is formed on the optical thin film 112. The light diffusion layer 113 is formed by arranging beads, using a film including a microlens array, and other common techniques.

In this projection screen 100, only light in a specific wavelength band of the light emitted from a projector is reflected from the optical thin film 112. This reflected light is diffused at the light diffusion layer 113 to form an image. On the other hand, the other light, emitted from the projector, is transmitted through the optical thin film 112 to be absorbed by the screen substrate 111. Since the optical thin film 112 serves as a band-pass filter to increase light/dark contrast, a distinct image can be displayed on the projection screen 100 even in a bright environment.

However, since the light diffusion layer 113 provides a viewing angle as small as 20°, the projection screen 100 cannot achieve satisfactory viewing characteristics.

SUMMARY OF THE INVENTION

Accordingly, an object of the present invention is to provide a projection screen on which distinct images can be formed and which exhibits enhanced viewing characteristics, and to provide a method for manufacturing the same.

According to an aspect of the present invention, a projection screen is provided which includes a substrate and a light diffusion control portion having a plurality of convex portions or concave portions on the surface of the substrate. An optical thin film overlies the light diffusion control portion and includes convex portions or concave portions having the same shape as that of the convex or concave portions of the light diffusion control portion. The optical thin film reflects light in a specific wavelength band and transmits at least visible light other than the light in the specific wavelength band.

By providing the light diffusion control portion having the plurality of convex or concave portions on the surface of the substrate and further providing the convex or concave portions having the same shape as that of the convex or concave portions of the light diffusion control portion to the optical thin film, light rays incident on the optical thin film have predetermined incident angles. Therefore, a predetermined percentage of the light in the specific wavelength band is diffuse-reflected at angles twice the incident angles. Thus the viewing angle of the screen is increased. Consequently, distinct images can be formed regardless of projection environment, and viewing characteristics can be enhanced.

According to another aspect of the present invention, a method for manufacturing a projection screen is provided. The method includes the steps of forming a light diffusion control portion having a plurality of convex portions or concave portions on the surface of a substrate; and forming an optical thin film on the light diffusion control portion so as to have convex portions or concave portions having the same shape as that of the convex or concave portions of the light diffusion control portion. The optical thin film reflects light in a specific wavelength band and transmits at least visible light other than the light in the specific wavelength band.

By forming the light diffusion control portion having the plurality of convex or concave portions on the surface of the substrate and further forming the optical thin film so as to have convex or concave portions having the same shape as that of the convex or concave portions of the light diffusion control portion, light rays incident on the optical thin film have incident angles at the convex or concave portions of the optical thin film. Therefore, a predetermined percentage of the light in the specific wavelength band is diffuse-reflected at angles twice the incident angles from the optical thin film. Thus, the viewing angle of the screen is increased.

Also, since the convex or concave portions are provided on the surface of the substrate to form the light diffusion control portion, a projection screen having a simple structure can be achieved by forming the optical thin film so as to have the convex or concave portions having the same shape as that of the convex or concave portions of the light diffusion control portion. As a result, the variation of optical characteristics, viewing characteristics, and other characteristics can be reduced, and, accordingly, reliability is increased. Also, manufacturing cost can be reduced.

The light diffusion control portion may be designed according to an optical simulation so that the convex or concave portions determine the angle of the reflection from the optical thin film. Thus, the range of reflection angle can appropriately be set, and, consequently, viewing characteristics can be controlled. Thus, viewing characteristics can further be enhanced.

The light diffusion control portion may include a plurality of spherical beads having a predetermined diameter and a bead-fixing layer filling the spaces between the beads to fix the beads. The thickness of the bead-fixing layer may be set with respect to the diameter of the beads, thereby determining the angles of reflection from the optical thin film. By setting the angles of the reflection from the optical thin film depending on the thickness of the bead-fixing layer, the range of reflection angle can appropriately be set, and, consequently, viewing characteristics can be controlled. Thus, viewing characteristics can further be enhanced.

DESCRIPTION OF THE PREFERRED EMBODIMENTS

Embodiments of the present invention will now be described with reference to the drawings.

Figure 1:
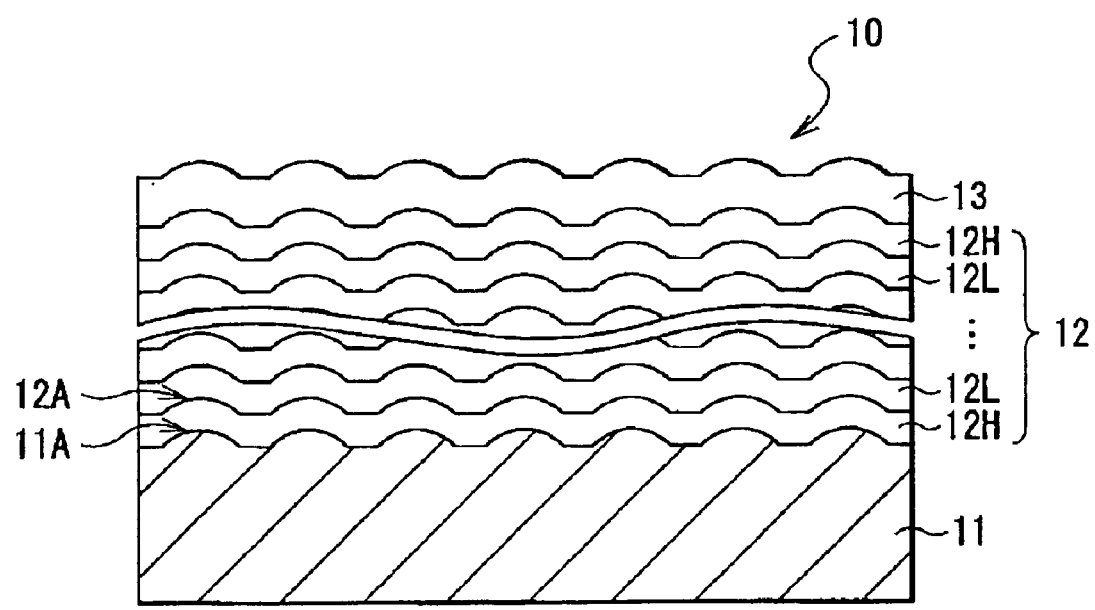
FIG. 1 is a schematic illustration of a projection screen according to an embodiment of the present invention.
Figure 2:
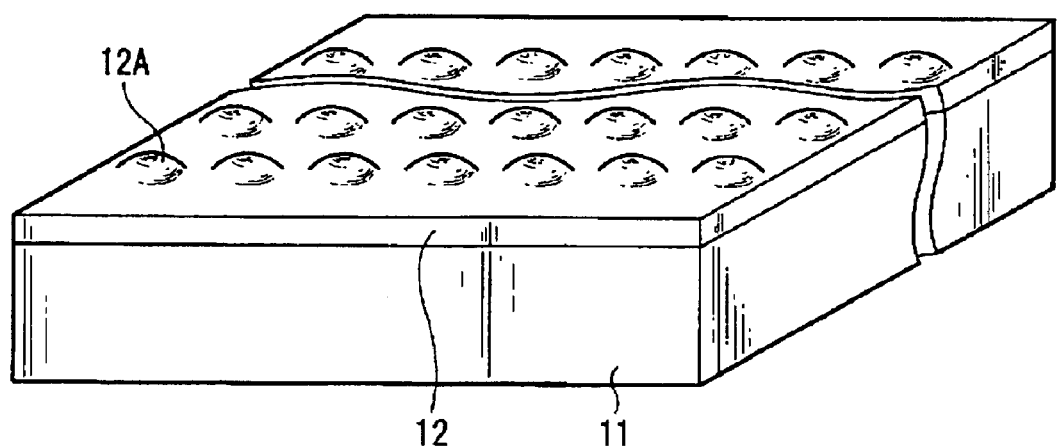
FIG. 2 is a perspective view of the projection screen shown in FIG. 1.
Figure 3:
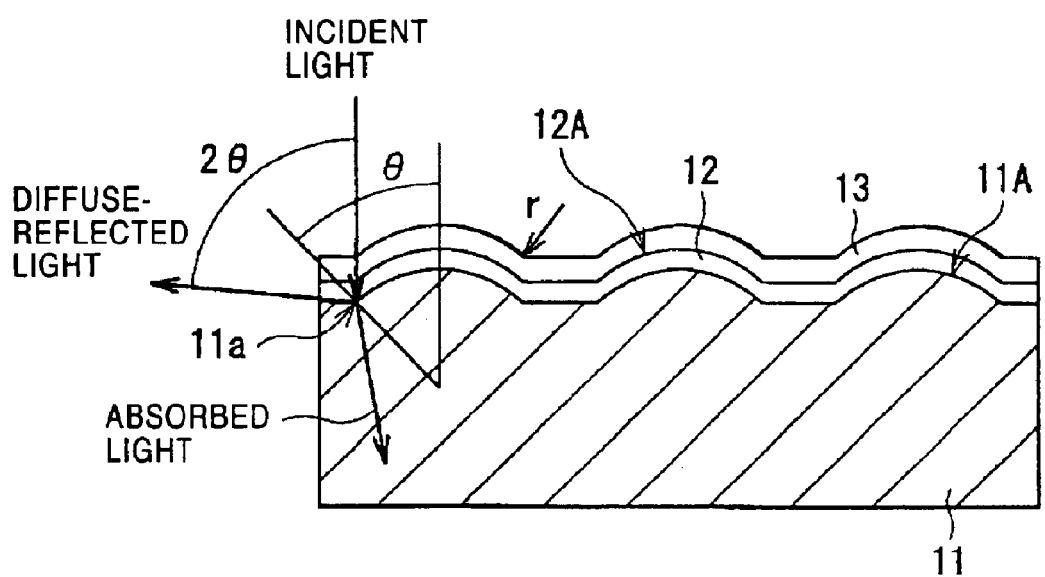
FIG. 3 is a schematic fragmentary enlarged view of the projection screen shown in FIG. 1.

FIG. 1 shows a cross section of part of a projection screen 10 according to an embodiment of the present invention. FIG. 2 is a perspective view of the projection screen 10. FIG. 3 is a fragmentary enlarged view of FIG. 1. FIG. 2 does not show the parts above an optical thin film 12 for convenience. This projection screen 10 is a so-called reflective screen. The projection screen 10 includes a substrate 11. The substrate 11 has a plurality of convex portions 11A constituting a light diffusion control portion on the surface thereof. A predetermined percentage of the light reflected from the optical thin film 12 is diffused due to the presence of the convex portions 11A. This mechanism will be described later. The optical thin film 12 serving as a band-pass filter is disposed on the substrate 11. The optical thin film 12 has convex portions 12A having the same shape as that of the convex portions 11A of the substrate 11. A protective film 13 covers the optical thin film 12.

The surface of the substrate 11 has flat regions between the convex portions 11A. Each convex portion 11A may have a spherical surface having a curvature radius of several micrometers to several millimeters. The shape, curvature radius r, arrangement, area ratio, and surface properties of the convex portions 11A are designed according to, for example, an optical simulation. The convex portions 11A allow reflected light from the optical thin film 12 to diffuse at a predetermined percentage.

The substrate 11 is formed of, for example, a macromolecular material containing a black paint. Exemplary macromolecular materials include polycarbonate (PC), polyethylene terephthalate (PET), polyethylene naphthalate (PEN), polyether sulfone (PES), and polyolefin (PO). Since the substrate 11 is colored black with the black paint, it can serve as a light absorber for absorbing light transmitted through the optical thin film 12, thereby increasing the black level on the screen to enhance the light/dark contract.

The optical thin film 12 is a dielectric laminate essentially composed of high-refractive-index layers 12H formed of a dielectric material having a high refractive index and low-refractive-index layers 12L formed of a dielectric material having a refractive index lower than that of the high-refractive-index layers 12H that are alternately layered. Exemplary dielectric materials for the high-refractive-index layers 12H include niobium pentoxide ($Nb_2O_5$), titanium dioxide ($TiO_2$), and tantalum pentoxide ($Ta_2O_5$). Exemplary dielectric materials for the low-refractive-index layers 12L include silicon dioxide ($SiO_2$) and magnesium fluoride ($MgF_2$).

Each layer of the optical thin film 12 is formed so as to have the convex portions 12A having the same shape as that of the convex portions 11A of the substrate 11. Each thickness of the layers of the optical thin film 12 is set according to a simulation based on a matrix method so that, for example, the optical thin film 12 reflects light in wavelength bands of the three primary colors, red, green, and blue, and transmits other light in at least a visible wavelength band. Specifically, the optical thin film 12 reflects red light having a wavelength of about 630 nm, green light having a wavelength of about 540 nm, and blue light having a wavelength of about 460 nm and transmits other light in at least a visible wavelength band. For example, each thickness of the layers is set in the range of 80 to 200 nm.

When light in the three primary color wavelength bands perpendicularly enter the optical thin film 12, the rays of the light have incident angles with respect to the surface of the optical thin film 12, at the convex portions 12A. Accordingly, a predetermined percentage of the light is diffused at angles twice the incident angles. More specifically, the maximum angle of the diffuse reflection of the rays depends on the angle θ formed by the straight line connecting a boundary point 11a with the center of the sphere defined by the spherical surface of the corresponding convex portion 11A and the normal to the surface of the top of the convex portion 11A, and it is 2θ, as shown in FIG. 3. Thus, a predetermined percentage of the light in the tree primary color wavelength bands is diffuse-reflected at reflection angles up to 2θ, and, consequently, the viewing angle of the screen is increased. The boundary point 11a, incidentally, is between the convex portions 11A and flat surfaces of the substrate 11.

The protective film 13 protects the optical thin film 12. The protective film 13 is also formed in the same shape as that of the surface of the optical thin film 12. However, the surface of the protective film 13 may be flat.

A method for manufacturing the projection screen 10 will now be described. The substrate 11 is prepared from a macromolecular material containing a black paint. The surface of the substrate 11 is subjected to, for example, embossing to form the plurality of convex portions 11A. The shape, curvature radius r, arrangement, area ratio, surface properties, and the like of the convex portions 11A are designed according to, for example, an optical simulation. Since the convex portions 11A allow light reflected from the optical thin film 12 to diffuse at a predetermined percentage, the range of diffuse reflection angle from the optical thin film 12 is appropriately set according to the design of the convex portions 11A. The regions of the surface of the substrate 11 between the convex portions 11A, incidentally, are flat.

The optical thin film 12 is deposited on the substrate 11 by, for example, sputtering. In this instance, the optical thin film 12 is formed so as to have convex portions 12A having the same shape as that of the convex portions 11A of the substrate 11. Also, the optical thin film 12 is a dielectric laminate formed by alternately laminating dielectric high-refractive-index layers 12H and dielectric low-refractive-index layers 12L having a refractive index lower than that of the high-refractive-index layers 12H. The thicknesses of the layers of the optical thin film 12 are set according to a simulation based on a matrix method so that, for example, the optical thin film 12 reflects light in wavelength bands of the three primary colors and transmits other light in at least a visible wavelength band. Finally, the protective film 13 is formed on the optical thin film 12. Thus, the projection screen 10 shown in FIG. 1 is completed.

Since, in the embodiment, the convex portions 11A of the substrate 11 is designed so as to allow light reflected from the optical thin film 12 to diffuse at a predetermined percentage, the optical thin film 12 overlying the substrate 11 can be provided with convex portions 12A having the same shape as that of the convex portions 11A of the substrate 11. Thus, the resulting screen has a simple structure.

The simulation based on the matrix method used for designing the optical thin film 12 will now be described. In this simulation, a dielectric laminate formed on a substrate is used as a model. If light enters the surface of this dielectric laminate at an angle from a light source, the light is multiple-reflected at the interfaces between the layers of the dielectric laminate. The rays of the multiple-reflected light interfere with each other depending on the wavelength of the light from the light source and the thickness and refractive index of the layers.

The matrix method is applied to this model of the dielectric laminate. Specifically, a matrix operation is performed so that optical lows, such as Maxwell's equations and Snell's law, satisfy boundary conditions of the layers of the dielectric laminate, using parameters, such as the wavelength of light, the thickness and refractive index of the substrate, the thickness and refractive index of the layers of the dielectric laminate, and the angle of incident light. Thus, optical properties of the dielectric laminate, such as transmittance and reflectance, are derived. According the derived optical properties, the dielectric laminate is designed.

Figure 4:
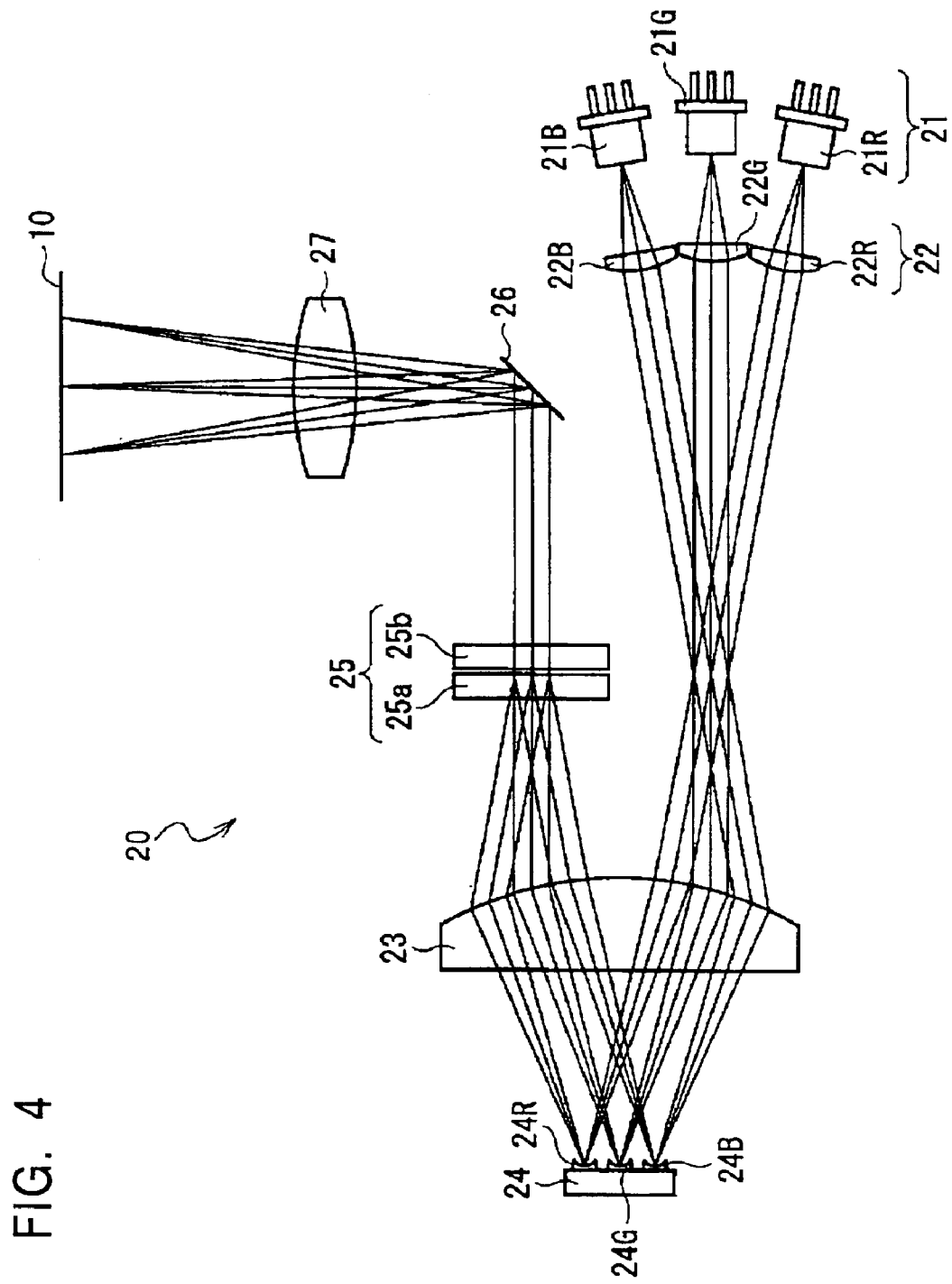
FIG. 4 is a schematic illustration of a projector using the projection screen shown in FIG. 1.

The projection screen 10 is used for, for example, a front projector 20 using a GLV. FIG. 4 is a schematic illustration of the projector 20. The projector 20 includes a laser oscillator unit 21 for emitting narrow-band light beams in wavelength bands of the three primary colors. The laser oscillator unit 21 includes, for example, a laser oscillator 21R for emitting a red light beam having a wavelength of 642 nm, a laser oscillator 21G for emitting a green light beam having a wavelength of 532 nm, and a laser oscillator 21B for emitting a blue light beam having a wavelength of 457 nm.

The projector 20 also includes an optical system comprising a collimator lens unit 22, a cylindrical lens 23, a GLV 24, volume hologram elements 25, a galvanometer mirror 26, and a projection lens 27. The collimator lens unit 22 is essentially composed of a collimator lens 22R for red light, a collimator lens 22G for green light, and a collimator lens 22B for blue light. The GLV 24 includes a ribbon line 24R for red light, a ribbon line 24G for green light, and a ribbon line 24B for blue light. The volume hologram elements 25 are a first volume hologram element 25a and a second volume hologram element 25b.

The red light beam emitted from the red laser oscillator 21R, the green light beam emitted from the green laser oscillator 21G, and the blue light beam emitted from the blue laser oscillator 21B enter the collimator lenses 22R, 22G, and 22B and subsequently enter the ribbon lines 24R, 24G, and 24B of the GLV 24, respectively.

The collimator lenses 22 convert the red, green, and blue light beams from the laser oscillator unit 21 into parallel light beams. The three color parallel light beams are condensed onto the GLV 24 by the cylindrical lens 23. The condensed light beams are spatially modulated by the respective ribbon lines 24R, 24G, and 24B of the GLV 24 separately driven according to image signals.

The modulated three color light beams are each condensed onto the volume hologram elements 25 by the cylindrical lens 23. The red light beam is diffracted through the first volume hologram element 25a and the red light beam and the blue light beam are diffracted in the same direction through the second volume hologram element 25b. The green light beam is not diffracted through the first and second volume hologram elements 25a and 25b, and thus travels in straight lines to be emitted in the same direction as that of the red light. Thus, the red, green, and blues light beams are synthesized in the same direction by the volume hologram elements 25. The synthesized light is scanned in predetermined directions at the galvanometer mirror 26 and finally projected onto the projection screen 10 through the projection lens 27.

In the projection screen 10, the three primary color light beams projected from the projector 20 enter the optical thin film 12 through the protective film 13. In this instance, even if external light enters the optical thin film 12 with the three color light beams, the optical thin film 12 reflects only the three color light beams and absorbs at least visible light of the external light, as shown in FIG. 3. Thus, distinct images can be displayed even in a bright environment. When the three color light beams perpendicularly enter the optical thin film 12, the rays of the light beams have predetermined incident angles with respect to the surface of the optical thin film 12, at the convex portions 12A. Accordingly, a predetermined percentage of the light in the three primary color wavelength bands is diffused at angles twice the incident angles.

As shown in FIG. 3, the maximum angle of the diffuse reflection of the light in the three primary color wavelength bands depends on the angle θ formed by the straight line connecting the boundary point 11a with the center of the sphere defined by the spherical surface of each convex portion 11A and the normal to the surface of the top of the corresponding convex portion 11A, and is 2θ. Consequently, since a predetermined percentage of the light is diffuse-reflected at angles up to 2θ, the viewing angle is increased and, consequently, viewing characteristics can be enhanced. Also, since the angle of the diffuse reflection depends on the convex portions 11A of the substrate, the angle can be set by appropriately designing the convex portions 11A.

In the present embodiment, the convex portions 11A are provided on the surface of the substrate and the optical thin film 12 overlying the substrate 11 is also provided with convex portions 12A having the same shape as that of the convex portions 11A of the substrate 11. The rays of light in three primary color wavelength bands incident on the optical thin film 12, therefore, have predetermined incident angles with respect to the optical thin film 12, at the convex portions 12A of the optical thin film 12, and are diffuse-reflected at angles twice the incident angles. Thus, a predetermined percentage of the light in the three primary color wavelength bands is diffused to increase the viewing angle of the screen. Consequently, distinct images can be obtained regardless of projection environment, and viewing characteristics can be enhanced. Also, since, by designing the convex portions 11A of the substrate 11 according to an optical simulation or the like, the range of the diffuse reflection angle can appropriately be set, viewing characteristics can be controlled to further enhance.

In addition, since the convex portions 11A allow light reflected from the optical thin film 12 to diffuse at a predetermined percentage, the resulting screen has a simple structure. As a result, the variation of optical characteristics, viewing characteristics, and other characteristics can be reduced. Accordingly, reliability is increased and manufacturing const is reduced.

Modification 1

Figure 5:
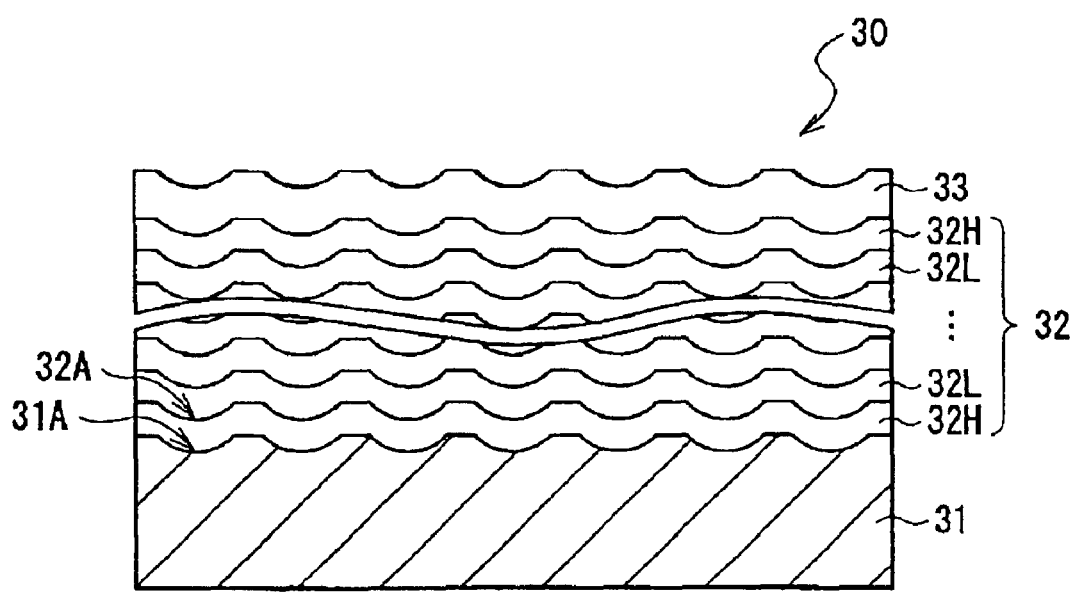
FIG. 5 is a schematic lustration of a projection screen according to a modification of the embodiment.
Figure 6:
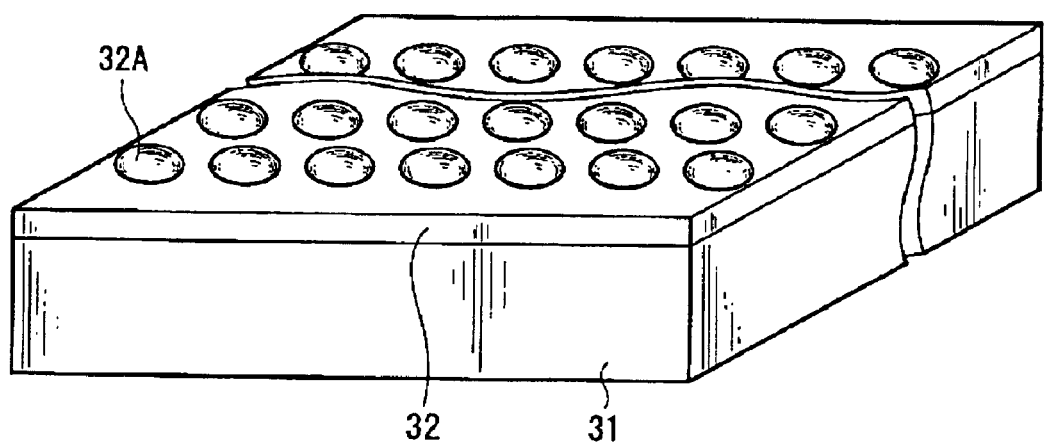
FIG. 6 is a perspective view of the projection screen according to the modification.

Although, in the foregoing embodiment, the plurality of convex portions 11A are provided on the surface of the substrate 11 to control diffuse reflection, concave portions 31A may be formed on the surface of a substrate 31, instead of the convex portions 11A, as shown in FIGS. 5 and 6. FIG. 6 does not show the parts above an optical thin film 32 for convenience.

A projection screen 30 including such a substrate 31 is manufactured according to the following. The substrate 31 is prepared from a macromolecular material containing a black paint as in the foregoing embodiment. The surface of the substrate 31 is subjected to, for example, embossing to form the concave portions 31A. Each concave portion 31A may have a curvature radius r of several micrometers to several millimeters. The shape, curvature radius r, arrangement, area ratio, surface properties, and the like of the concave portions 31A are designed according to, for example, an optical simulation. Since the concave portions 31A allow light reflected from the optical thin film 32 to diffuse at a predetermined percentage, the range of the diffuse reflection angle from the optical thin film 32 is appropriately set according to the design of the concave portions 31A. The regions of the surface of the substrate 31 between the concave portions 31A, incidentally, are flat.

The optical thin film 32 is deposited on the substrate 31 by, for example, sputtering. In this instance, the optical thin film 32 is formed so as to have concave portions 32A having the same shape as that of the concave portions 31A of the substrate 31. The optical thin film 32 is a dielectric laminate essentially composed of high-refractive-index layers 32H and low-refractive-index layers 32L having a refractive index lower than that of the high-refractive-index layers that are alternately laminated. The thickness of the layers of the optical thin film 32 is set according to a simulation based on a matrix method so that, for example, the optical thin film 32 reflects light in three primary color wavelength bands and transmits other light in at least a visible wavelength band. Finally, the protective film 33 is formed on the optical thin film 32. Thus, the projection screen 30 shown in FIG. 5 is completed.

Figure 7:
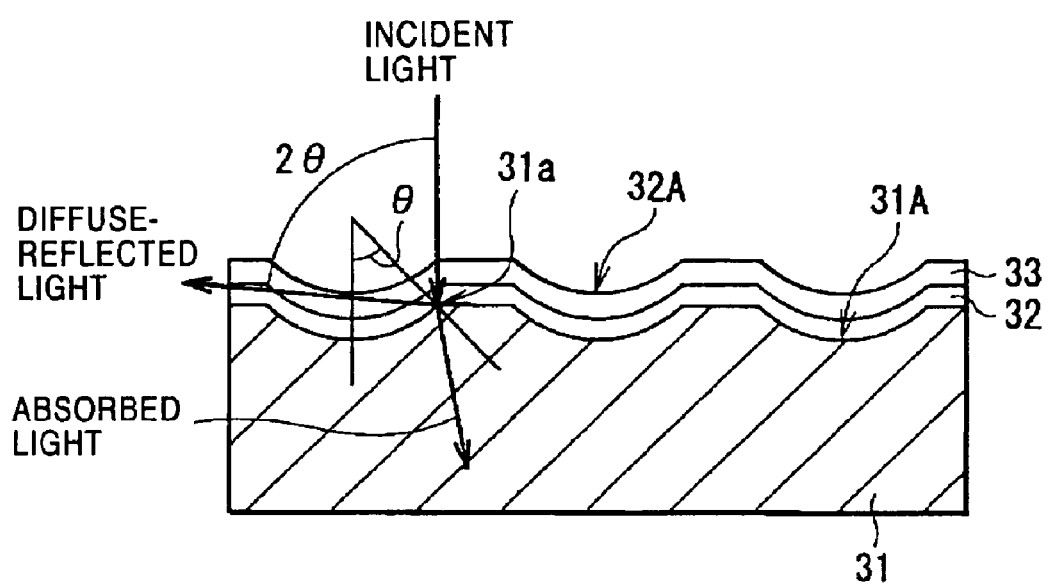
FIG. 7 is a schematic fragmentary enlarged view of the projection screen according to the modification.

In the modification, the maximum diffuse reflection angle from the optical thin film 12 depends on the angle θ formed by the straight line connecting a boundary point 31a with the center of the sphere defined by the spherical surface of the corresponding concave portion 31A and the normal to the surface of the bottom of the corresponding concave portion 31A, and it is 2θ, as shown in FIG. 7. Therefore, a predetermined percentage of incident light in the three primary color wavelength bands is diffuse-reflected at angles twice the incident angles, up to 2θ. Since the maximum diffuse reflection angle 2θ determines the viewing angle of the projection screen 30, the range of the diffuse reflection angle can be set to enhance viewing characteristics by appropriately designing the concave portions 31A of the substrate 31. Other effects are the same as in the foregoing embodiment, the description is not repeated. The boundary point 31a, incidentally, is between the concave portions 31A and flat surfaces of the substrate 31.

Modification 2

Figure 8:
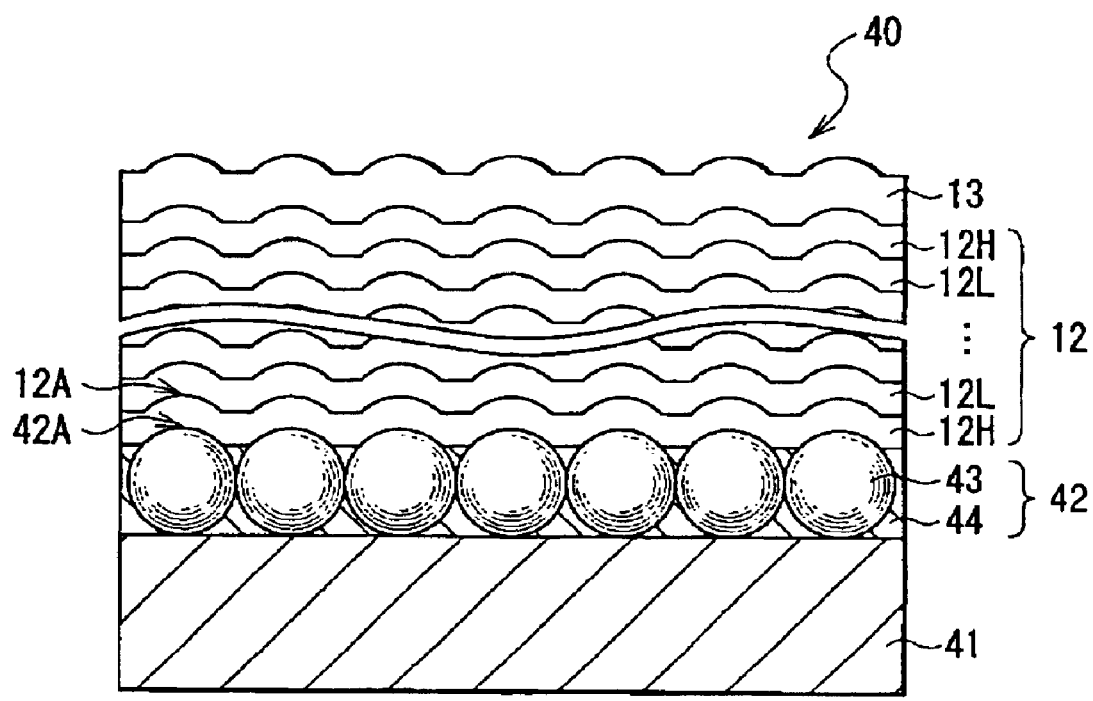
FIG. 8 is a schematic lustration of a projection screen according to a modification of the embodiment.

Although, in the foregoing embodiment, the plurality of convex portions 11A serving as a light diffusion control portion are formed on the surface of the substrate 11 by, for example, embossing, a light diffusion control portion 42 may be provided on a substrate 41, as shown in FIG. 8. The light diffusion control portion 42 is essentially composed of a plurality of beads 43 and a bead-fixing layer 44 filling between the beads to fix the beads 43.

The beads 43 are formed of glass or a transparent material, such as a polymer, in a spherical shape having a uniform diameter d of, for example, several micrometers to several millimeters. The bead-fixing layer 44 is formed of a resin or the like to fix the beads, filling the spaces between the beads 43. The thickness of the bead-fixing layer 44 is, for example, smaller than the diameter d of the beads. Thus, convex portions 42A similar to the convex portions 11A of the foregoing embodiment can be formed on the surface of the light diffusion control portion 42. An optical thin film 12 having the same shape as that of the convex portions 42A of the light diffusion control portion 42 and a protective film 13 are formed on the light diffusion control portion 42 in that order. Thus, a projection screen 40 is completed.

Figure 9:
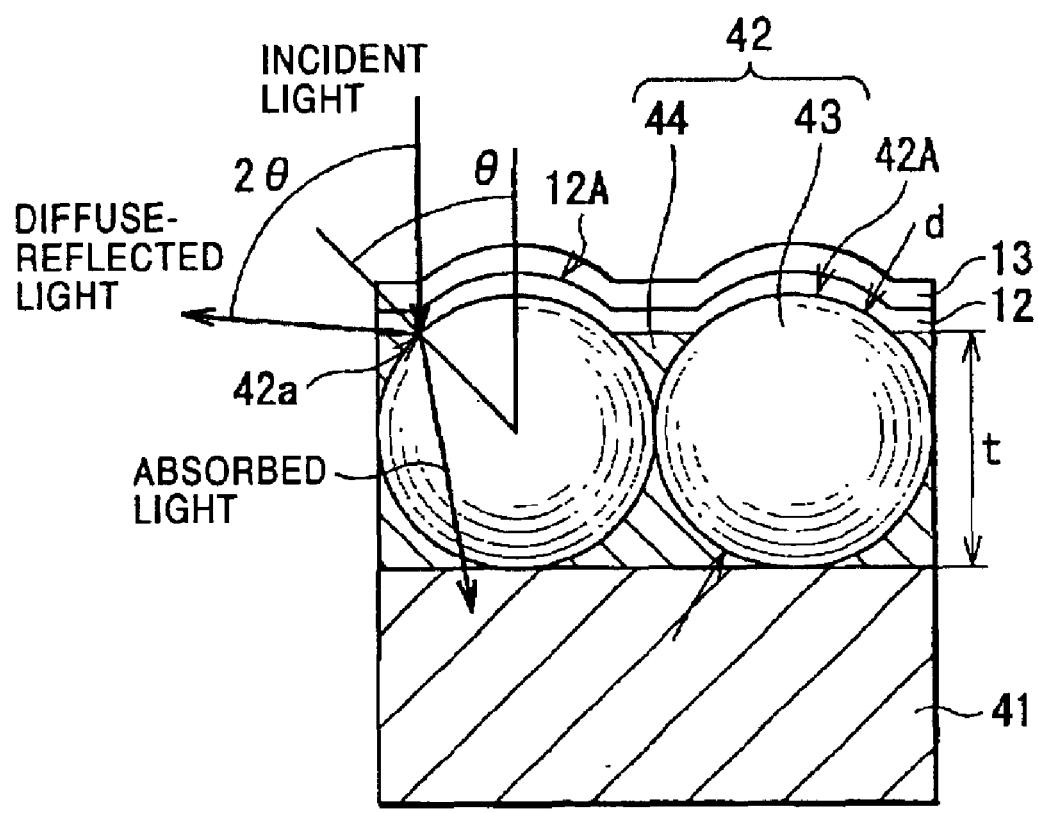
FIG. 9 is a schematic fragmentary enlarged view of the projection screen according to the modification.
Figure 10:
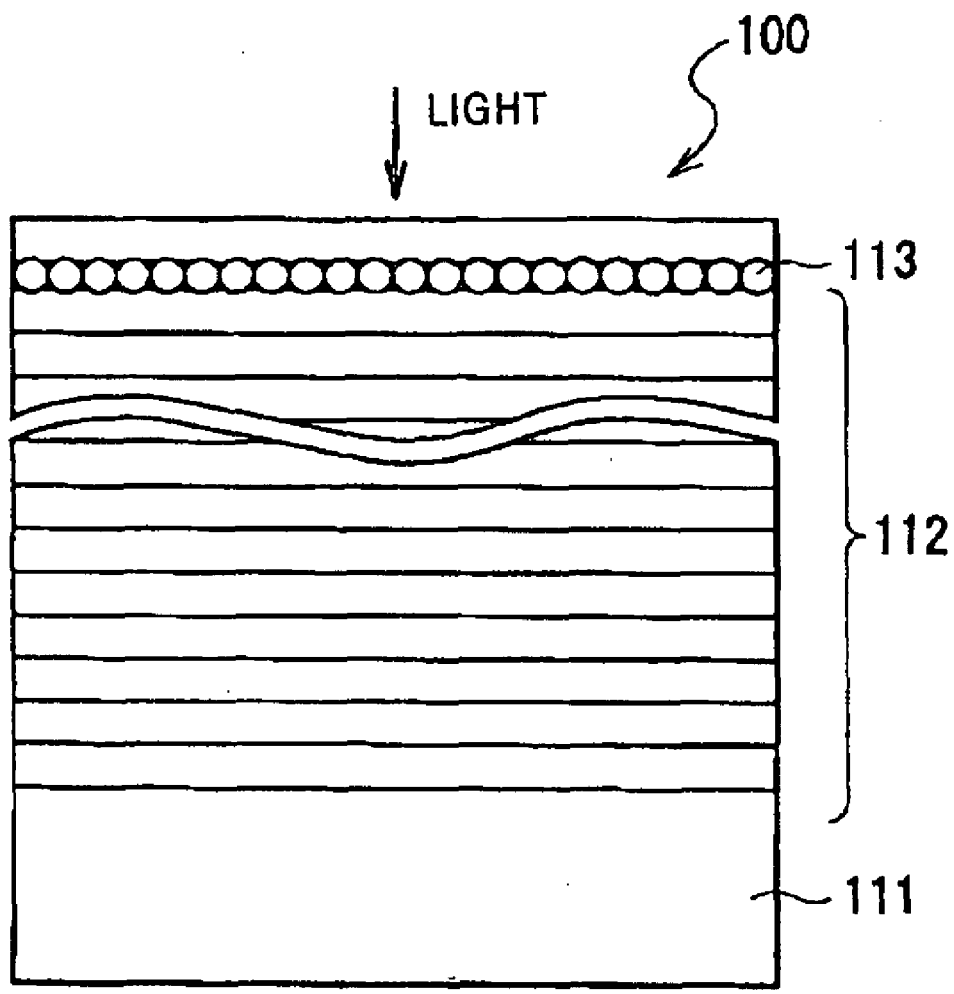
FIG. 10 is a schematic lustration of a known projection screen.

In this modification, by varying the thickness t of the bead-fixing layer 44 with respect to the diameter d of the beads 43, as shown in FIG. 9, the viewing angle can appropriately be set. Specifically, the maximum angle of the diffuse reflection from the optical thin film 12 depends on the angle θ formed by the straight line connecting a boundary point 42a between the beads 43 and the bead-fixing layer 44 with the center of the corresponding bead 43 and the normal to the surface of the top of the bead 43, and it is 2θ.

By varying the thickness t of the bead-fixing layer 44 with respect to the diameter d of the beads 43, the maximum diffuse reflection angle 2θ can be set at a desired value, and, thus, a desired viewing angle can be achieved. Other effects are the same as in the foregoing embodiment, and the description is not repeated.

Although, in this modification, the light diffusion control portion 42 is essentially composed of the plurality of beads 43 and the bead-fixing layer 44, the light diffusion control portion 42 may have other components. For example, the light diffusion control portion may be a film including a microlens array (MLA), having a plurality of convex portions.

Although the present invention has been illustrated herein using preferred embodiment and modifications, it is not limited to the form of the embodiment and modifications and other various modifications may be made. For example, while the convex portions 11A have spherical surfaces in the foregoing embodiment, they may be formed in other shapes. For example, the convex portions 11A have oval surfaces or asymmetrical surfaces. Thus, diffuse reflection angles from the optical thin film 12 can be adjusted in the vertical direction and the horizontal direction, by the function of these convex portions.

Also, while the convex portions 11A are formed by embossing the substrate 11 in the foregoing embodiment, they may be formed by etching. In addition, while, in the foregoing embodiment, the substrate 11 is formed of a macromolecular material containing a black paint to absorb light other than the light in the three primary color wavelength bands, the substrate may be provided with a light absorption layer formed of a black paint on the back surface thereof to absorb the light.

What is claimed is:

1. A projection screen on which an image is displayed by receiving projection light, comprising:
    a substrate;
    a light diffusion control portion on a surface of the substrate, having a plurality of convex portions or concave portions; and
    an optical thin film on the light diffusion control portion, the optical thin film having convex portions or concave portions having same shapes as that of the convex or concave portions of the light diffusion control portion, the optical thin film reflecting light in a specific wavelength band and transmitting at least visible light other than light in the specific wavelength bands;
    wherein the optical thin film comprises a dielectric laminate including alternately laminated high-refractive-index layers and low-refractive-index layers, and a thickness of each layer of the dielectric laminate is in a range of 80 to 200 nm.

2. A projection screen according to claim 1, wherein the convex portions or concave portions of the light diffusion control portion are formed by processing the substrate.

3. A projection screen according to claim 2, wherein the convex portions or concave portions of the light diffusion control portion are designed by an optical simulation so as to determine an angle of light reflection from the optical thin film.

4. A projection screen according to claim 3, wherein the convex portions or concave portions of the light diffusion control portion have spherical surfaces.

5. A projection screen according to claim 1, wherein the light diffusion control portion comprises: a plurality of spherical beads having a predetermined diameter; and a bead-fixing layer filling spaces between the beads to fix the beads.

6. A projection screen according to claim 5, wherein a thickness of the bead-fixing layer is set with respect to the diameter of the beads, thereby determining an angle of reflection from the optical thin film.

7. A projection screen according to claim 1, wherein the high-reflective-index layers are comprised from materials selected from a group consisting of $Nb_2O_5$, $TiO_2$, and $Ta_2O_5$.

8. A projection screen according to claim 7, wherein the low-refractive-index layers comprise $SiO_2$ or $MgF_2$.

9. A projection screen according to claim 1, further comprising a light absorption layer for absorbing light transmitted through the optical thin film.

10. A projection screen according to claim 9, wherein the light absorption layer contains a black paint.

11. A projection screen according to claim 10, wherein the substrate functions as the light absorption layer.

12. A projection screen according to claim 11, wherein the substrate comprises a macromolecular material.

13. A projection screen according to claim 12, wherein the macromolecular material is selected from a group consisting of polycarbonate, polyethylene terephthalate, polyethylene naphthalate, polyether sulfone, and polyolefin.

14. A projection screen according to claim 1, wherein the projection light is a laser beam.

15. A projection screen according to claim 1, wherein the specific wavelength band includes a red wavelength band, a green wavelength band, and a blue wavelength band.

16. A method for manufacturing a projection screen on which an image is displayed by receiving projection light, the method comprising the steps of:
    forming a light diffusion control portion having a plurality of convex portions or concave portions on a surface of a substrate; and
    forming an optical thin film on the light diffusion control portion so as to have convex portions or concave portions having same shapes as that of the convex or concave portions of the light diffusion control portion, the optical thin film reflecting light in a specific wavelength band and transmitting at least visible light other than light in the specific wavelength band;
    wherein the optical thin film comprises a dielectric laminate including alternately laminated high-refractive-index layers and low-refractive-index layers, and the thickness of each layer of the dielectric laminate is in a range of 80 to 200 nm.

17. A method for manufacturing a projection screen according to claim 16, wherein the light diffusion control portion is formed by processing the substrate.

18. A method for manufacturing a projection screen according to claim 17, wherein the light diffusion control portion is designed by an optical simulation so that the convex portions or concave portions of the light diffusion control portion determine an angle of light reflection from the optical thin film.

19. A method for manufacturing a projection screen according to claim 18, wherein the convex portions or concave portions of the light diffusion control portion have spherical surfaces.

20. A method for manufacturing a projection screen according to claim 16, wherein the step of forming the light diffusion control portion comprises sub steps of: forming a plurality of spherical beads having a predetermined diameter; and forming a bead-fixing layer between the beads to fix the beads.

21. A method for manufacturing projection screen according to claim 20, wherein a thickness of the bead-fixing layer is set with respect to the diameter of the beads, thereby determining an angle of reflection from the optical thin film.

22. A method for manufacturing a projection screen according to claim 16, wherein the high-reflective-index layers are formed from a material selected from a group consisting of $Nb_2O_5$, $TiO_2$, and $Ta_2O_5$.

23. A method for manufacturing a projection screen according to claim 22, wherein the low-refractive-index layers are formed of $SiO_2$ or $MgF_2$.

24. A method for manufacturing a projection screen according to claim 16, further comprising a step of forming a light absorption layer for absorbing light transmitted through the optical thin film.

25. A method for manufacturing a projection screen according to claim 24, wherein the light absorption layer contains a black paint.

26. A method for manufacturing a projection screen according to claim 25, wherein the substrate functions as the light absorption layer.

27. A method for manufacturing a projection screen according to claim 26, wherein the substrate is formed of a macromolecular material.

28. A method for manufacturing a projection screen according to claim 27, wherein the macromolecular material is selected from a group consisting of polycarbonate, polyethylene terephthalate, polyethylene naphthalate, polyether sulfone, and polyolefin.

29. A method for manufacturing a projection screen according to claim 16, wherein the specific wavelength band includes a red wavelength band, a green wavelength band, and a blue wavelength band.

* * * * *